US012474918B2

(12) United States Patent
Okuda et al.

(10) Patent No.: US 12,474,918 B2
(45) Date of Patent: Nov. 18, 2025

(54) INFORMATION PROCESSING DEVICE AND SYSTEM

(71) Applicant: TOYOTA JIDOSHA KABUSHIKI KAISHA, Toyota (JP)

(72) Inventors: Masataka Okuda, Toyota (JP); Masatoshi Kakutani, Miyoshi (JP); Kaoru Yoshida, Nisshin (JP); Kanade Kuriyama, Toyota (JP); Toshiki Shinohara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 18/457,623

(22) Filed: Aug. 29, 2023

(65) Prior Publication Data

US 2024/0160432 A1    May 16, 2024

(30) Foreign Application Priority Data

Nov. 16, 2022    (JP) .................................. 2022-183339

(51) Int. Cl.
*G06F 8/65*    (2018.01)
(52) U.S. Cl.
CPC ...................... *G06F 8/65* (2013.01)

(58) Field of Classification Search
CPC .................................................. G06F 8/61–65
See application file for complete search history.

(56) References Cited

U.S. PATENT DOCUMENTS

| 2019/0384870 A1 | 12/2019 | Shiraishi et al. |
| 2023/0315717 A1* | 10/2023 | Mesde .................... G06F 9/546 |
| | | 707/613 |

FOREIGN PATENT DOCUMENTS

JP    2020-013557 A    1/2020

* cited by examiner

*Primary Examiner* — Duy Khuong T Nguyen
(74) *Attorney, Agent, or Firm* — SoraIP, Inc.

(57) ABSTRACT

An information processing device for constructing a traffic digital twin synchronized with a real space in a virtual space based on data received from a plurality of devices, the information processing apparatus comprising: an acquisition unit that acquires information on service provision from an application; a setting unit that sets an update cycle for updating the traffic digital twin based on the information acquired by the acquisition unit; and a communication unit that receives data from the plurality of devices according to the update cycle set by the setting unit.

6 Claims, 3 Drawing Sheets

FIG. 2

<UPDATE PERIOD TABLE>

| | TRAFFIC DIGITAL TWIN COMPLETION X [%] | | | |
|---|---|---|---|---|
| | X < 30 | 30 ≤ X < 60 | 60 ≤ X < 80 | 80 ≤ X |
| DYNAMIC OBJECT INFORMATION (MOBILITY) | 5 SECONDS OR MORE | 1 SECOND TO 5 SECONDS | 100 MILLISECONDS TO 1 SECOND | 10 MILLISECONDS TO 100 MILLISECONDS |
| DYNAMIC OBJECT INFORMATION (PERSON) | 20 SECONDS OR MORE | 10 TO 20 SECONDS | 1 SECOND TO 10 SECONDS | 100 MILLISECONDS TO 1 SECOND |
| STATIC OBJECT INFORMATION (OBSTACLES/ FALLING OBJECTS) | 3 HOURS OR MORE | 1 TO 3 HOURS | 1 MINUTE TO 1 HOUR | 10 SECONDS TO 1 MINUTE |
| CONSTRUCTION INFORMATION (TRAFFIC STOP, ALTERNATING TRAFFIC) | 1 MONTH OR MORE | 10 DAYS TO 1 MONTH | 1 TO 10 DAYS | 12 HOURS TO 1 DAY |
| ROAD MAP INFORMATION | MORE THAN 3 MONTHS | 1 MONTH TO 3 MONTHS | 10 DAYS TO 1 MONTH | 5 TO 10 DAYS |

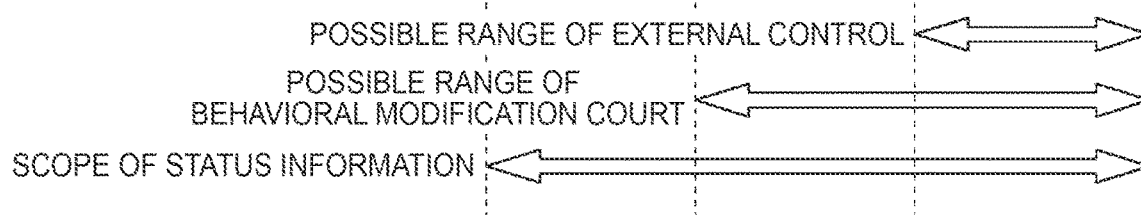

POSSIBLE RANGE OF EXTERNAL CONTROL
POSSIBLE RANGE OF BEHAVIORAL MODIFICATION COURT
SCOPE OF STATUS INFORMATION

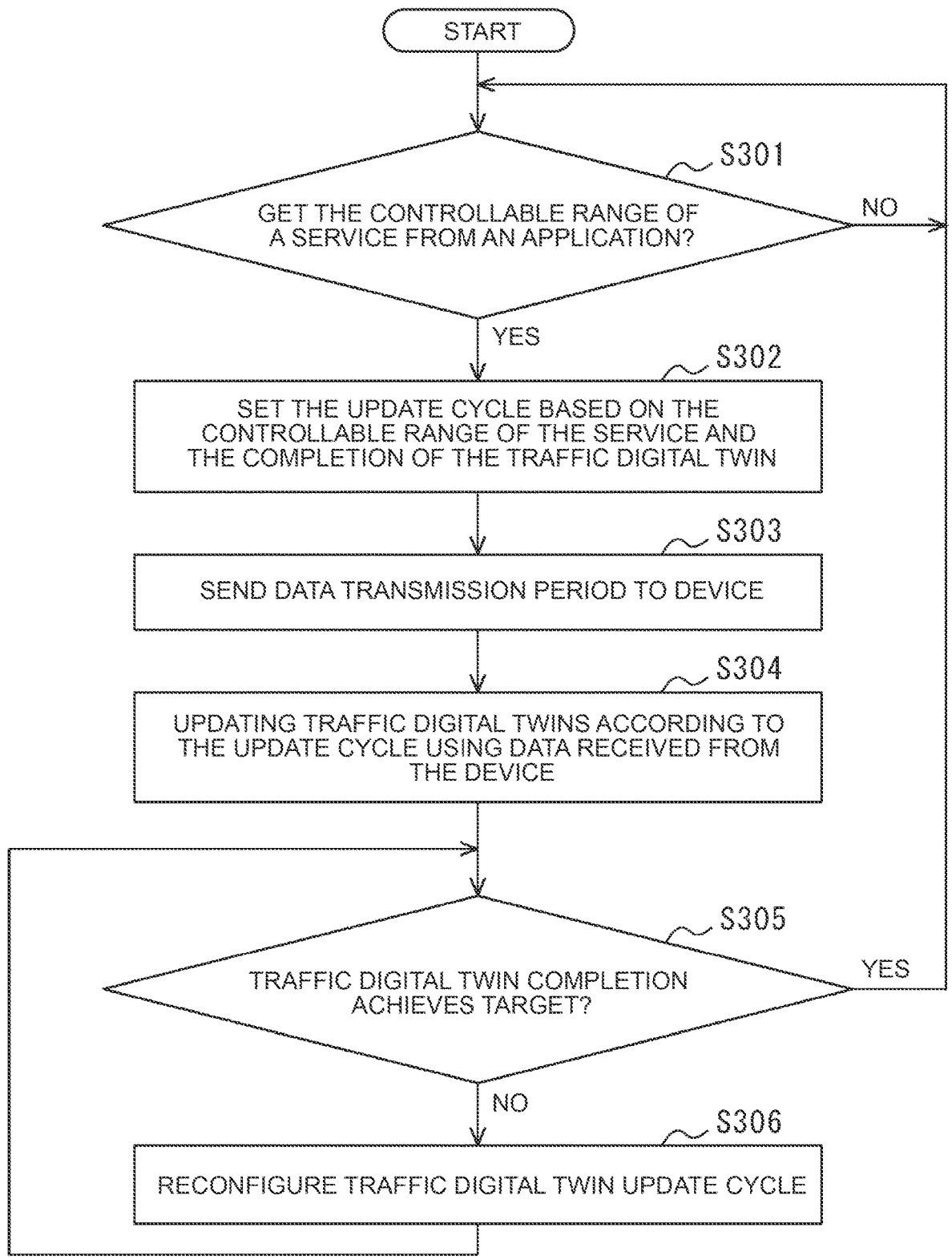

INFORMATION PROCESSING DEVICE AND SYSTEM

CROSS-REFERENCE TO RELATED APPLICATION

This application claims priority to Japanese Patent Application No. 2022-183339 filed on Nov. 16, 2022, incorporated herein by reference in its entirety.

BACKGROUND

1. Technical Field

The present disclosure relates to an information processing device that communicates with a plurality of vehicles, and the like.

2. Description of Related Art

Japanese Unexamined Patent Application Publication No. 2020-013557 (JP 2020-013557 A) discloses a system in which a server provided on a cloud receives digital data (vehicle data) describing a state of a vehicle and a behavior of the vehicle from a plurality of vehicles and updates a traffic digital twin constructed in the server based on the received vehicle data.

SUMMARY

In order to improve a degree of completion (accuracy) of the traffic digital twin, it is necessary to shorten the cycle of (increase the reception frequency of) receiving data from a device such as a vehicle, and to accelerate the update of the traffic digital twin. However, if the update cycle of the traffic digital twin is simply shortened, provision of the service using the traffic digital twin may be affected by compression of a communication band between the device and the server, an increase in a communication amount, and the like.

The present disclosure has been made in view of the above issue, and an object of the present disclosure is to provide a communication processing device and the like capable of changing an update cycle of a traffic digital twin based on information about provision of a service.

In order to solve the above issue, an aspect of the technique of the present disclosure is an information processing device that constructs, on a virtual space, a traffic digital twin that is time-synchronized with a real space, based on data received from a plurality of devices. The information processing device includes: an acquisition unit that acquires information about provision of a service from an application; a setting unit that sets an update cycle for updating the traffic digital twin, based on the information acquired by the acquisition unit; and a communication unit that receives the data from the devices in accordance with the update cycle set by the setting unit.

With the information processing device and the like according to the present disclosure, the reception cycle of the data from the devices and the update cycle of the traffic digital twin are dynamically changed based on the information about the provision of the service. Accordingly, it is possible to restrain interruption of the provision of the service to the devices by the application while suppressing compression of a communication band between the communication processing device and the devices, an increase in a communication amount, and the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is an exemplary update cycle table held by the information processing device; and FIG. 3 is a flow chart of a traffic digital twin updating cycle control executed by the information processing device.

DETAILED DESCRIPTION OF EMBODIMENTS

Figure 1:
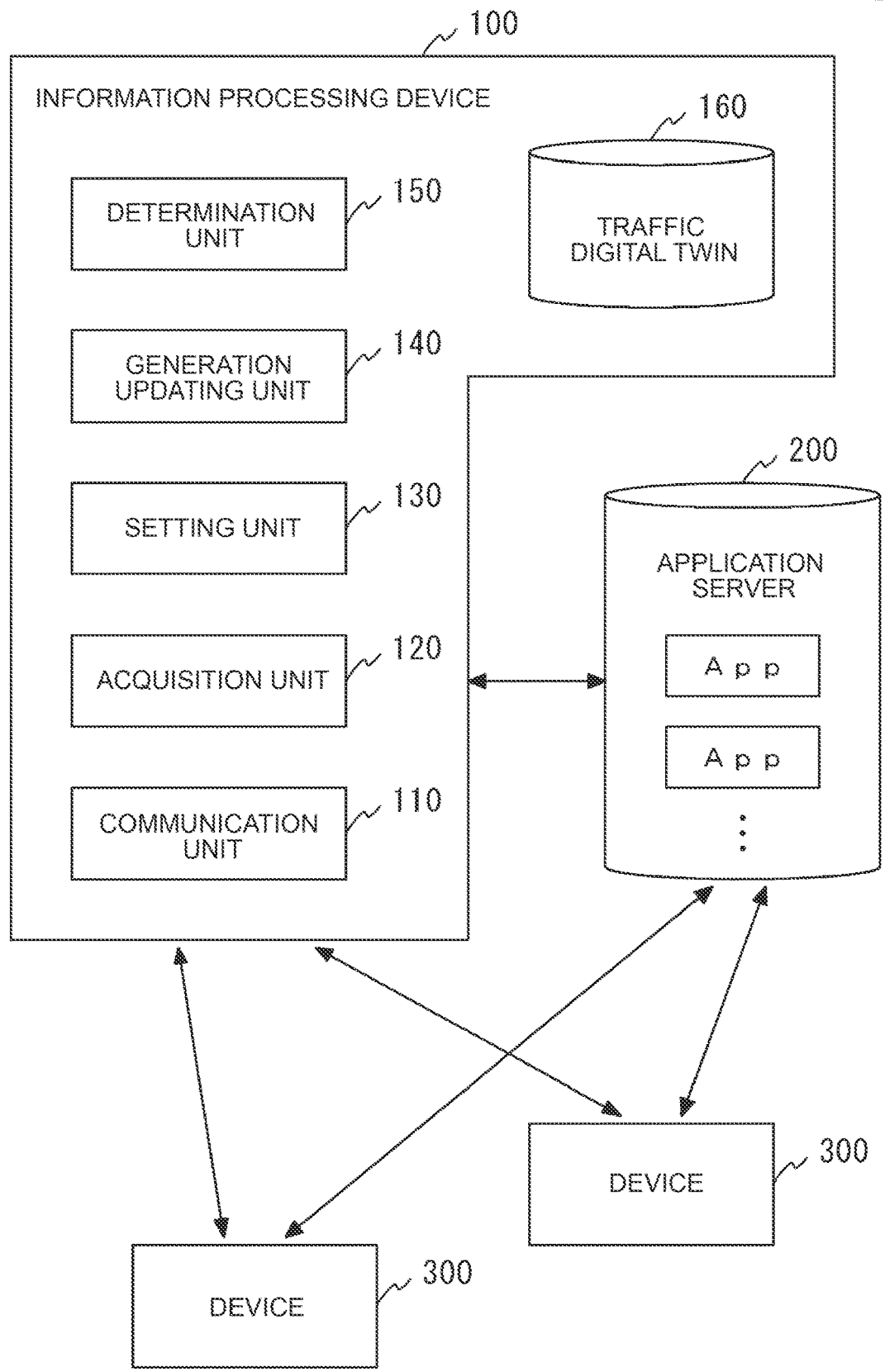
FIG. 1 is a schematic configuration diagram of a system including an information processing device according to an embodiment of the present disclosure.

In order to ensure the completeness of the traffic digital twin necessary to realize the service provided to the device by the application, the information processing device of the present disclosure changes the cycle of collecting data from the device and the cycle of updating the traffic digital twin. This avoids interruption of service provision to the device by the application. Hereinafter, an embodiment of the present disclosure will be described in detail with reference to the drawings.

Embodiment

Configuration

FIG. 1 is a schematic configuration diagram of a system 10 including an information processing device 100, an application server 200, and a plurality of devices 300 according to an embodiment of the present disclosure. In the system 10, the information processing device 100, the application server 200, and the plurality of devices 300 are connected to each other so as to be able to communicate with each other.

(1) Device

The plurality of devices 300 performs communication with the information processing device 100 and the application server 200. The plurality of devices 300 are, for example, mobility or IoT devices such as vehicles. The number of devices 300 that can communicate with the information processing device 100 and/or the application server 200 is not limited to the number illustrated in FIG. 1. One or more of the plurality of devices 300 are configured to be able to receive a predetermined service provided by an application (App) implemented in the application server 200 by requesting the application server 200.

In addition, the plurality of devices 300 can provide information on their own state, data necessary for constructing a traffic digital twin 160 to be described later in the information processing device 100, and the like to the information processing device 100. The period in which the plurality of devices 300 provides information and data is performed based on a request (instruction) from the information processing device 100. The data relating to the state of the device 300 includes data such as the position, speed, and direction of movement of the device. The data necessary to construct the traffic digital twin 160 includes data regarding dynamic objects (mobility, persons, etc.) and static objects (obstacles, falling objects, etc.) existing around the device 300. Various sensors (not shown) mounted on the vehicle can be used to acquire these data.

(2) Application Server

The application server 200 is configured to perform communication with the plurality of devices 300 and provide a predetermined service (function or value) to at least one of the plurality of devices 300. The application server 200 implements one or more applications (App) required to provide services. As the service implemented by the application, various services having different contents (expected values) required for the traffic digital twin 160 may be exemplified, for example, a service for remotely controlling exercise (running, stopping, turning) or a service for notifying surrounding information (danger notification/status notification) for the device 300 of mobility.

In addition, the application server 200 performs communication with the information processing device 100, and transmits, to the information processing device 100, information related to the provision of the service by the application (App). The information about the provision of the service is typically information about the extent of completeness (controllable range) of the traffic digital twin 160 that can be controlled by the application. More specifically, the information regarding the provision of the service is exemplified by a range of the degree of completion of the traffic digital twin 160 that enables remote control (hereinafter, referred to as "external control") from the outside of the device 300, a range of the degree of completion of the traffic digital twin 160 that enables a danger notification (hereinafter, referred to as "action change caution") that triggers a change in the behavior of the user of the device 300, and a range of the degree of completion of the traffic digital twin 160 that enables notification (hereinafter, referred to as "situation information") of the status of the device 300 to the user of the device 300.

In the present embodiment, the application server 200 is described as a configuration different from that of the information processing device 100. However, the application server 200 may be configured to be included in the information processing device 100.

(3) Information Processing Device

The information processing device 100 is a configuration for performing control necessary for the application server 200 to provide a service to the device 300. The information processing device 100 includes a communication unit 110, an acquisition unit 120, a setting unit 130, a generation updating unit 140, a determination unit 150, and a traffic digital twin 160. The information processing device 100 can be configured, for example, on a cloud (such as a cloud server).

The traffic digital twin 160 is a virtual world (virtual space) in which a real world (real space) in which a plurality of devices 300 exist is reproduced on a cloud computer in time synchronization with the real world. The traffic digital twin 160 is generated based on data regarding current and past device states obtained (collected) from the plurality of devices 300, and the like. In the traffic digital twin 160, objects (dynamic objects, static objects, and the like) and traffic conditions (construction work, and the like) on a travel path are all replicated in a place (road or the like) where various devices participating in the system 10 including the plurality of devices 300 can move. Examples of the information included in the data for generating the traffic digital twin 160 include device information (such as VIN), information regarding traffic of another device (including a bicycle, a pedestrian, and the like), map information, time information (time stamp), position information (GPS latitude/longitude), and trajectory information (moving velocity, direction of movement, and the like) that is a moving trajectory. Further, in the traffic digital twin 160, while data cannot be acquired (collected) from the plurality of devices 300 (data not acquired period), the virtual world in the data not acquired period is estimated based on the future value predicted from the acquired data.

The determination unit 150 determines the degree of completion of the traffic digital twin 160. The completeness of the traffic digital twin 160 is typically given a value of 0% to 100%. For example, the determination unit 150 can determine the degree of completion of the traffic digital twin 160 in accordance with, for example, a ratio of the virtual world reproduced as the traffic digital twin 160 on the cloud by the generation updating unit 140 to match the real world in which the plurality of devices 300 exist. Further, the determination unit 150 determines whether or not the determined completion degree of the traffic digital twin 160 has reached a predetermined target value. The predetermined target value may be set based on information related to the provision of the service.

The communication unit 110 performs communication with the application server 200 and the plurality of devices 300. The communication unit 110 receives, from the plurality of devices 300, data including information on the state of the device 300 (such as a position, a speed, and a moving direction), information on the generation of the traffic digital twin 160 (such as information on the surroundings of the device 300 and information on the communication quality), and the like. In addition, the communication unit 110 transmits a data transmission cycle determined in accordance with the update cycle of the traffic digital twin 160 set by the setting unit 130 to the plurality of devices 300.

The acquisition unit 120 acquires information related to service provision from the application server 200 via the communication unit 110. The information related to the provision of the service is, for example, the information of the external control, the information of the action modification court, the status information, and the like. Further, the acquisition unit 120 acquires the degree of completion of the traffic digital twin 160 generated (and updated) by the generation updating unit 140.

Based on the information on the provision of the service acquired by the acquisition unit 120 and the degree of completion of the traffic digital twin 160, the setting unit 130 sets the update cycle of the traffic digital twin 160 performed by the generation updating unit 140. An example of a method of setting an update cycle performed by the setting unit 130 will be described with reference to FIG. 2. FIG. 2 is a diagram illustrating an example of an update cycle table held by the information processing device 100.

In the update cycle table illustrated in FIG. 2, according to the degree of completion of the traffic digital twin 160, a target cycle in which the information of the traffic digital twin 160 is to be updated based on the actual data from the plurality of devices 300 in order to realize the degree of completion is determined in advance for each element forming the traffic digital twin 160. Elements constituting the traffic digital twin 160 are defined by dynamic objects (mobility), dynamic objects (persons), static objects (obstacles/falling objects), construction work, and road maps. The degree of completion of the traffic digital twin 160 is defined by "less than 30%", "30% or more and less than 60%", "60% or more and less than 80%", and "80% or more".

In this update cycle table, for example, when it is desired to maintain the traffic digital twin 160 at a completion level of "80% or more", it is indicated that for dynamic object information (mobility) in which a change may occur in a short time, frequent updates are desirable in a cycle of 10 milliseconds to 100 milliseconds. On the other hand, it is shown that the road map information that does not cause a short-time change in the situation can be updated by a cycle of 5 days to 10 days. Further, in the update cycle table, for example, when the traffic digital twin 160 may have a completion degree of "30% or more and less than 60%", it is shown that the cycle of information update of each element may be prolonged as compared with the cycle in the completion degree of "60% or more and less than 80%" and the cycle in the completion degree of "80% or more".

In the present embodiment, the range (or the lower limit value) of the degree of completion of the traffic digital twin 160 necessary for realizing the service provision to the device 300 is set in advance in the external control, the action change action, and the situation information, which are information related to the provision of the service transmitted by the application server 200 to the information processing device 100. In the example of FIG. 2, it is shown that for external controls controlling the device 300, "80% or more" is required as the degree of completion of the traffic digital twin 160. For a behavioral modification that is not the control of the device 300 but is likely to affect the device 300, it is indicated that a "60% or more" is required as the completion degree of the traffic digital twin 160. For situational information that is less likely to affect rather than control the device 300, it is indicated that "30% or more" is required as the completion degree of the traffic digital twin 160.

The setting unit 130 refers to the update period table and sets the update period of the traffic digital twin 160 according to the following rule based on the information on the service provision notified from the application server 200 and the completion degree of the traffic digital twin 160. For example, when the information of the external control is received as the information on the service provision from the application (App) of the application server 200, the degree of completion of the traffic digital twin 160 required for the service provision of the external control is "80% or more". Therefore, the setting unit 130 sets the update cycle of the traffic digital twin 160 to any one of the cycles from 10 milliseconds to 100 milliseconds. In addition, for example, when the information of the action change coding is received from the first application of the application server 200 and the information of the status information is received from the second application, the setting unit 130 selects the information of the first application that requires a higher degree of completion of the traffic digital twin 160 among these pieces of information (arbitration function). Further, the setting unit 130 sets the update cycle of the traffic digital twin 160 to any one of the cycles of 100 milliseconds to 1 second corresponding to the completion degree "60% or more" of the traffic digital twin 160 necessary for providing the service of the action change caution.

In the above example, a case has been described in which one update cycle is set as the update cycle of the traffic digital twin 160 with respect to all the elements (dynamic objects (mobility), dynamic objects (persons), static objects (obstacles/falling objects), construction, and road maps) constituting the traffic digital twin 160. However, the update cycle of the traffic digital twin 160 may be set for each of the elements constituting the traffic digital twin 160. In the case where the external control information is received from the application (App), an update cycle is set for the dynamic object information (mobility) on the traffic digital twin 160 in a range of 10 milliseconds to 100 milliseconds. For the dynamic object information (person), an update cycle is set in a range of 100 milliseconds to 1 second. For the static object information (obstacle/falling object), an update cycle is set in a range of 10 seconds to 1 minute. For the construction information, an update cycle is set in the range of 12 hours to one day. For the road map information, an update cycle is set in a range of 5 days to 10 days.

The setting unit 130 transmits, to the plurality of devices 300, a period in which the information processing device 100 wants to collect data including information on the state of the device 300, information related to the generation of the traffic digital twin 160, and the like from the plurality of devices 300, that is, a period in which data is requested to be transmitted from the plurality of devices 300 to the information processing device 100, as a data transmission period, based on the update period of the traffic digital twin 160 set in this manner. The data transmission period of the plurality of devices 300 may be the same as the update period of the traffic digital twin 160 or may be shorter than the update period of the traffic digital twin 160. For example, even if an update cycle of 1 second is set for dynamic object information (person), a data transmission cycle of 100 milliseconds may be transmitted to the plurality of devices 300.

The generation updating unit 140 generates the traffic digital twin 160 via the communication unit 110 based on data including information on the state of the device 300 received from the plurality of devices 300, information related to the generation of the traffic digital twin 160, and the like. Further, the generation updating unit 140 updates the generated traffic digital twin 160 in accordance with the update cycle set by the setting unit 130. The traffic digital twin 160 may be generated at all times or only while any application (App) of the application server 200 is running (while the device 300 is serviced).

Some or all of the configurations of the information processing device 100 described above may be configured as a unit including a Central Processing Unit (CPU), a Random Access Memory (RAM), and a readable/writable storage device such as a hard disk drive (HDD) or a solid state drive (SSD). This unit implements the various functions described above by executing the program read from the storage device by CPU using RAM as a working area.

Control

Next, a process executed by the information processing device 100 according to the present embodiment will be described with reference to FIG. 3. FIG. 3 is a flowchart for explaining a processing procedure of the update cycle control of the traffic digital twin 160 executed by the information processing device 100. The update cycle control of the traffic digital twin 160 illustrated in FIG. 3 is started when the traffic digital twin 160 is generated (activated). Further, the update cycle control is repeatedly executed until the generation of the traffic digital twin 160 is no longer necessary (activation ends).

S301

The acquisition unit 120 of the information processing device 100 determines, from one or more applications (App) of the application server 200, whether or not the controllable scope of the service has been acquired as information related to the provision of the service. The controllable range of the service is the above-described external control, the action modification caution, the situation information, and the like. When the acquisition unit 120 acquires the controllable scope of the service from the application (S301, Yes), the process proceeds to S302.

S302

The setting unit 130 of the information processing device 100 sets the update cycle of the traffic digital twin 160 based on the controllable range of the service acquired by the acquisition unit 120 and the completion degree of the traffic digital twin 160. The update cycle is set in accordance with the above-described rules. When only the controllable range of the service allowing the long update period is notified from the application (App) while the short update period is already set, the setting of the short update period may be continued as it is, or a new long update period may be set. In the former case, further improvement in the degree of completion of the traffic digital twin 160 can be expected. In the latter case, communication resources (communication band, communication cost) between the information processing device 100 and the device 300 can be effectively utilized. When the updating cycle of the traffic digital twin 160 is set by the setting unit 130, the process proceeds to S303.

S303

The setting unit 130 of the information processing device 100 determines a period for collecting data from the device 300 based on the set update period of the traffic digital twin 160. The setting unit 130 transmits the determined cycle to the plurality of devices 300 as a data transmission cycle. The plurality of devices 300 serving as transmission destinations of the data transmission period are all the devices 300 connected to (participating in) the system 10. When the setting unit 130 transmits the data-transmission cycle to the plurality of devices 300, the process proceeds to S304.

S304

The generation updating unit 140 of the information processing device 100 updates the traffic digital twin 160 in accordance with the update cycle using data including information on the state of the device 300 received from the plurality of devices 300, information related to the generation of the traffic digital twin 160, and the like. A well-known technique can be applied to the update method of the traffic digital twin 160. When the traffic digital twin 160 is updated in accordance with the update cycle using the data received from the plurality of devices 300 by the generation updating unit 140, the process proceeds to S305.

S305

The determination unit 150 of the information processing device 100 determines the completion degree of the traffic digital twin 160 updated by the generation updating unit 140. Further, the determination unit 150 determines whether or not the determined degree of completion has reached a predetermined target value. This determination is made to determine whether the degree of completion of the traffic digital twin 160 has changed according to the update cycle of the new traffic digital twin 160 set based on the controllable range of the service. For example, when the update cycle of the traffic digital twin 160 is set based on the notification of the external control from the application server 200, a value with a target value of 80% or more can be set. Note that reaching the target value includes a case where the completion degree of the traffic digital twin 160 increases and reaches the target value, and a case where the completion degree of the traffic digital twin 160 decreases and reaches the target value.

When the determination unit 150 determines that the completion degree of the traffic digital twin 160 has reached the target (S305, Yes), the process proceeds to S301. On the other hand, if the determination unit 150 determines that the completion degree of the traffic digital twin 160 has not yet reached the target (S305, No), the process proceeds to S306.

S306

The setting unit 130 of the information processing device 100 sets the update cycle of the currently set traffic digital twin 160 again. The update period is reset so that the degree of completion of the traffic digital twin 160 is controlled in a direction approaching the target value. Specifically, if the completion degree of the current traffic digital twin 160 is smaller than the target value, the update period of the traffic digital twin 160 is reset to be shorter. If the degree of completion of the current traffic digital twin 160 is greater than the target value, the update period of the traffic digital twin 160 is reset to be longer. When the updating cycle of the traffic digital twin 160 is reset by the setting unit 130, the process proceeds to S305.

By repeating the setting of the update cycle of the traffic digital twin 160 in this manner, the traffic digital twin 160 having a degree of completion suitable for the service to be provided by the application can be created.

Operations and Effects

As described above, according to the information processing device 100 according to the embodiment of the present disclosure, the update cycle of the traffic digital twin 160 is dynamically changed so that the traffic digital twin 160 that can appropriately execute the control for the application to provide the service to the device 300 can be created based on the information regarding the provision of the service transmitted from the application server 200. Further, the cycle of data collected by the information processing device 100 from the plurality of devices 300 is changed based on the update cycle of the traffic digital twin 160.

By this processing, the degree of completion of the traffic digital twin 160 can be optimized for a service desired to be realized by an application. It is possible to avoid the occurrence of an event in which the service provision to the device 300 by the application becomes impossible or interrupted. In addition, it is possible to suppress compression of a communication band between the information processing device 100 and the device 300, an increase in a communication amount, and the like.

Although an embodiment of the present disclosure has been described above, the present disclosure can be regarded as a method executed by an information processing device including not only an information processing device but also a processor and a memory, a program for executing the method, a computer-readable non-transitory storage medium storing a program, and a system including an information processing device and a device such as a vehicle.

The information processing device of the present disclosure is useful in a case where it is desired to suitably control the update cycle of the traffic digital twin built on the cloud in accordance with the contents of the service provided to the device.

What is claimed is:

1. An information processing device configured to construct a traffic digital twin in a virtual space based on data received from a plurality of devices, the digital twin being time-synchronized with a real space, the information processing device comprising a processor configured to:
    acquire information about provision of a service provided to at least one of the devices by an application, the acquired information including information about a required degree of completion of the traffic digital twin that is required to enable the service by the application;
    set an update cycle for updating the traffic digital twin based on the required degree of completion, wherein the update cycle is set longer when the required degree of completion is within a first range than when the required degree of completion is within a second range, the second range having a lower limit value that is greater than an upper limit value of the first range;
    transmit information indicating a data transmission cycle to the devices in response to setting the update cycle for updating the traffic digital twin, the data transmission cycle having the same duration as the update cycle;

receive the data transmitted from the devices in accordance with the data transmission cycle, the received data including data for constructing the traffic digital twin;

update the traffic digital twin in accordance with the update cycle using the received data;

acquire a current degree of completion of the updated traffic digital twin;

determine whether the current degree of completion is a target value that is predetermined based on the acquired information about the provision of the service; and reset the update cycle of the updated traffic digital twin in response to determining that the current degree of completion is not the target value, the update cycle being reduced in a case where the current degree of completion is smaller than the target value, and the update cycle being increased in a case where the current degree of completion is greater than the target value.

2. The information processing device according to claim 1, wherein the processor is configured to correct the traffic digital twin using a future value predicted from current data received from the devices, after the traffic digital twin is updated based on the current data until next data is received.

3. The information processing device according to claim 1, wherein the information about the required degree of completion includes information relating to at least one of the following:

the degree of completion of the traffic digital twin required to enable the service from an outside of the devices;

the degree of completion of the traffic digital twin required to enable notification of danger that triggers a change in behavior of a user of each of the devices; and the degree of completion of the traffic digital twin required to enable notification of the user of each of the devices of a situation.

4. The information processing device according to claim 1, wherein the update cycle is determined for each of elements making up the traffic digital twin.

5. The information processing device according to claim 1, wherein the processor is further configured to acquire plural pieces of information about the provision of the service of plural applications, and select a piece of information from the acquired plural pieces of information, the selected piece of information corresponding to an application that requires the highest degree of completion of the traffic digital twin among the plural applications, and the update cycle is set based on the highest degree of completion.

6. The information processing device according to claim 4, wherein the elements are defined by dynamic objects, static objects, construction work, and road maps.

* * * * *